US012756517B2

(12) United States Patent
Dai et al.

(10) Patent No.: US 12,756,517 B2
(45) Date of Patent: Oct. 6, 2026

(54) SYSTEM AND METHOD FOR SYNCHRONIZATION ASSISTANCE

(71) Applicant: ZTE CORPORATION, Nanshan (CN)

(72) Inventors: Jianqiang Dai, Shenzhen (CN); Nan Zhang, Shenzhen (CN); Chenchen Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 746 days.

(21) Appl. No.: 18/194,915

(22) Filed: Apr. 3, 2023

(65) Prior Publication Data

US 2023/0261838 A1 Aug. 17, 2023

Related U.S. Application Data

(63) Continuation of application No. PCT/CN2020/123107, filed on Oct. 23, 2020.

(51) Int. Cl.
*H04L 5/00* (2006.01)
*H04B 7/185* (2006.01)
(Continued)

(52) U.S. Cl.
CPC ....... *H04L 5/0051* (2013.01); *H04B 7/18513* (2013.01); *H04W 36/0072* (2013.01); *H04W 72/0446* (2013.01)

(58) Field of Classification Search
CPC ............ H04B 7/18513; H04B 7/18504; H04B 7/1851; H04B 7/18519; H04B 7/1855;
(Continued)

(56) References Cited

U.S. PATENT DOCUMENTS

2011/0312288 A1* 12/2011 Fu .......................... H04B 1/406 455/88
2012/0113825 A1* 5/2012 Baglin .................. H04W 24/00 370/252
(Continued)

FOREIGN PATENT DOCUMENTS

CN 110912846 A 3/2020
WO WO-2020/014107 A1 1/2020
(Continued)

OTHER PUBLICATIONS

Ericsson, "On UL time and frequency synchronization enhancements for NTN", 3GPP TSG-RAN WG1 Meeting #102-e, R1-2005502, Aug. 28, 2020, e-Meeting (13 pages).
(Continued)

*Primary Examiner* — Bailor C Hsu
(74) *Attorney, Agent, or Firm* — Foley & Lardner LLP

(57) ABSTRACT

A system and method for transmission indications are disclosed herein. In one embodiment, the system and method are configured to allocate, by a wireless communication node, a time gap for a wireless communication device to monitor a synchronization-assistance signal, wherein the time gap is periodically or aperiodically allocated along a time-domain. In an alternate embodiment, the system and method are configured to receive a synchronization-assistance signal during a time gap, wherein the time gap is periodically or aperiodically inserted along a time-domain according to a wireless communication node.

19 Claims, 9 Drawing Sheets

(51) Int. Cl.
*H04W 36/00* (2009.01)
*H04W 72/0446* (2023.01)

(58) Field of Classification Search
CPC ............. H04L 5/0051; H04L 27/26025; H04L 5/0048; H04L 5/0053; H04W 72/0446; H04W 76/28; H04W 72/231; H04W 72/232; H04W 24/08; H04W 36/0072; H04W 52/0209; H04W 56/001; H04W 56/0015; H04W 56/0035; H04W 56/0045; Y02D 30/70
See application file for complete search history.

(56) References Cited

U.S. PATENT DOCUMENTS

| | | | | |
|---|---|---|---|---|
| 2017/0041773 | A1* | 2/2017 | Fujishiro | H04W 48/12 |
| 2017/0331620 | A1* | 11/2017 | Tsai | H04L 7/042 |
| 2018/0184391 | A1* | 6/2018 | Ly | H04W 72/1215 |
| 2018/0227011 | A1* | 8/2018 | Yerramalli | H04B 1/713 |
| 2018/0270776 | A1 | 9/2018 | Yasukawa et al. | |
| 2018/0324753 | A1* | 11/2018 | Islam | H04W 68/02 |
| 2018/0332549 | A1* | 11/2018 | Bhattad | H04W 56/001 |
| 2019/0159224 | A1 | 5/2019 | Yasukawa et al. | |
| 2020/0037283 | A1 | 1/2020 | Edge et al. | |
| 2021/0219248 | A1* | 7/2021 | Wu | H04W 56/001 |
| 2022/0232503 | A1* | 7/2022 | Cheng | H04W 56/009 |
| 2024/0031954 | A1* | 1/2024 | Wu | H04W 56/004 |

FOREIGN PATENT DOCUMENTS

| | | |
|---|---|---|
| WO | WO-2020/075044 A1 | 4/2020 |
| WO | WO-2020/082211 A1 | 4/2020 |

OTHER PUBLICATIONS

Extended European Search Report for EP Appl. No. 20958281.6, dated Oct. 10, 2023 (16 pages).

Intel Corporation, "Discussion on SFN timing difference in Dual connectivity", 3GPP TSG-RAN WG4 Meeting #71, R4-143028, May 23, 2014, Seoul, Korea (7 pages).

International Search Report and Written Opinion for PCT Appl. No. PCT/CN2020/123107, mailed Jul. 21, 2021 (8 pages).

Office Action for KR Appl. No. 10-2023-7011847, dated Jun. 27, 2024 (with English translation, 9 pages).

Office Action for JP App. No. 2025-002772 dated Sep. 18, 2025 (with English translation, 2 pages).

* cited by examiner

SYSTEM AND METHOD FOR SYNCHRONIZATION ASSISTANCE

CROSS-REFERENCE TO RELATED APPLICATION

This application claims the benefit of priority under 35 U.S.C. § 120 as a continuation of PCT Patent Application No. PCT/CN2020/123107, filed on Oct. 23, 2020, the disclosure of which is incorporated herein by reference in its entirety.

TECHNICAL FIELD

The disclosure relates generally to wireless communications and, more particularly, to systems and methods for synchronization assistance.

BACKGROUND

In areas where there is weak terrestrial network service or no terrestrial network service, a non-terrestrial network ("NTN") network may be employed to support connectivity of massive Internet of Things ("IoT") devices. NTNs such as Geostationary Earth Orbit ("GEO") satellites or Low Earth Orbit ("LEO") satellites can provide continental local or regional services. However, special considerations must be made when using NTN networks.

The fast movement of satellites relative to a user's position on earth can lead to Doppler frequency shifting. Further, satellite communication systems may be affected by long propagation delays resulting from the distance of satellites to terrestrial wireless communication devices. Continuous repeated transmissions may increase the performance of a receiver in an attempt to counter the effect of the propagation loss. However, lengthy repeated transmissions may cause ineligible time value changes and frequency shifting.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes allocating, by a wireless communication node, a time gap for a wireless communication device to monitor a synchronization-assistance signal, wherein the time gap is periodically or aperiodically allocated along a time-domain.

In another embodiment, a method performed by a wireless communication device includes receiving a synchronization assistance signal during a time gap, wherein the time gap is periodically or aperiodically inserted along a time-domain according to a wireless communication node.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
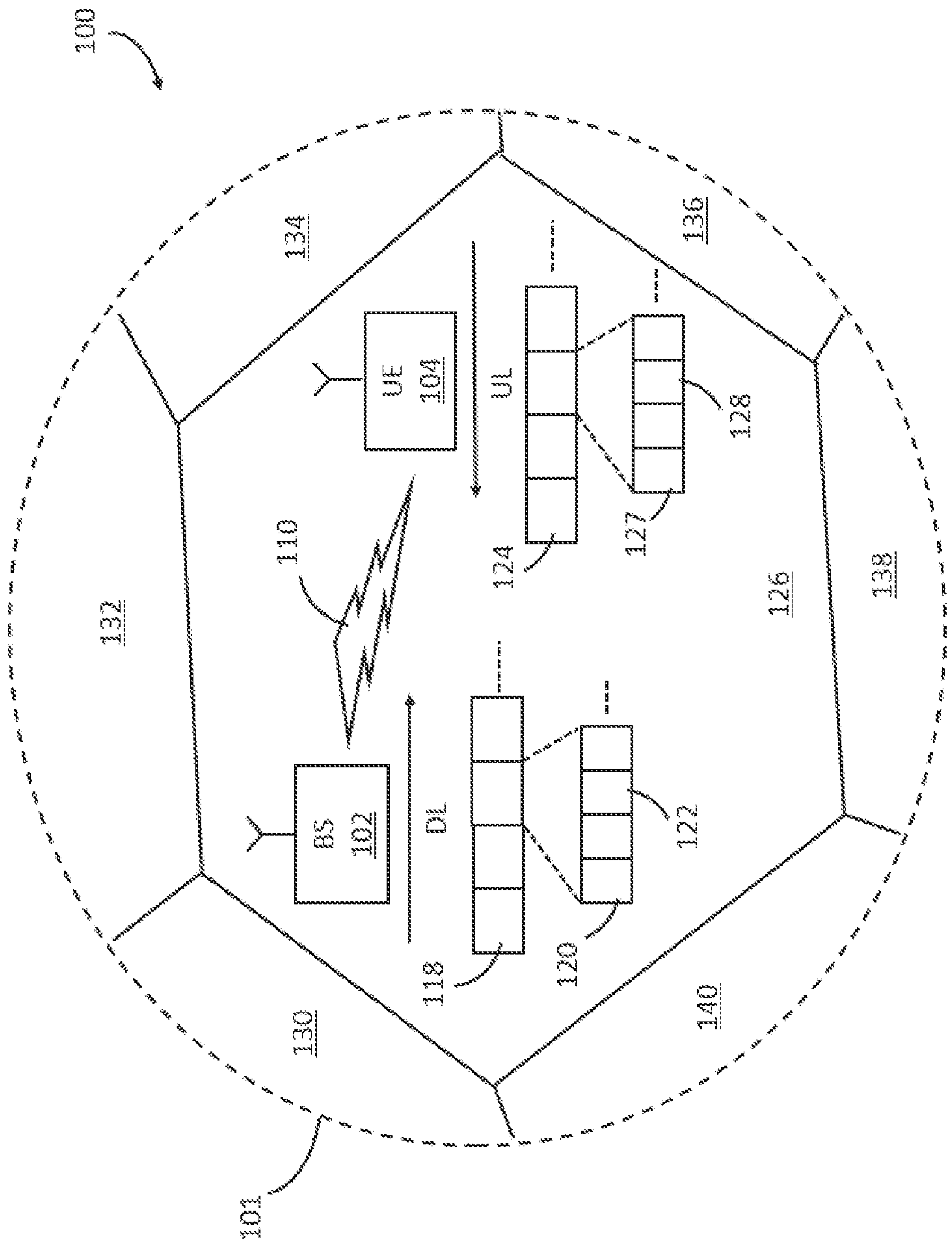
FIG. 1 illustrates an example cellular communication network in which techniques and other aspects disclosed herein may be implemented, in accordance with some embodiments of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into subframes 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
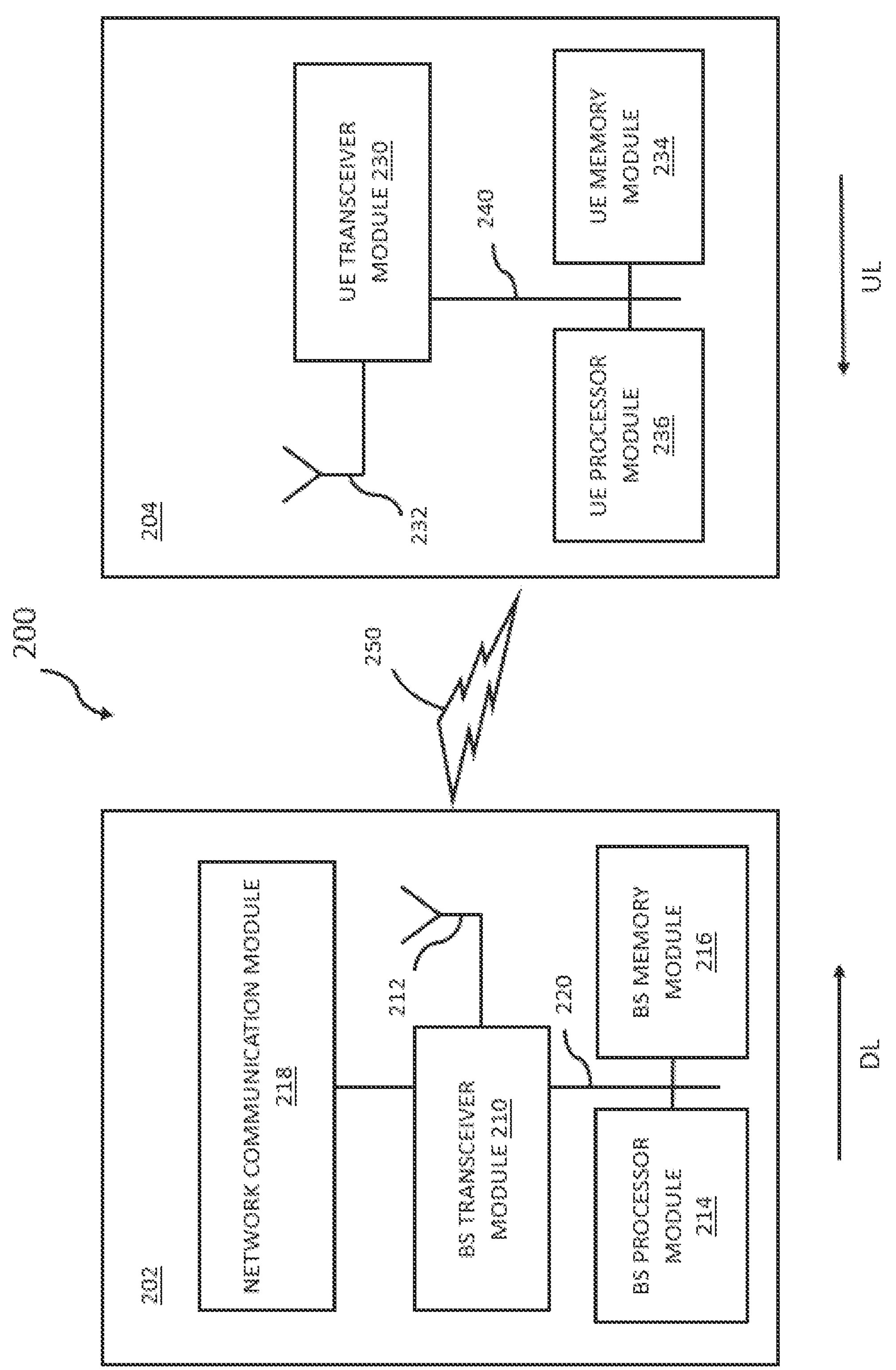
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., half-duplexing signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

When devices communicate via half-duplex ("HD"), devices may not transmit and receive simultaneously. In other words, a UE cannot process UL transmission and DL transmission at the same time. Thus, there is an asymmetric flow for UL and DL data transmission. Examples of these devices may include low-cost narrow band devices that connect to the internet (narrow band Internet of Things devices ("NB-IoT") such as sensors and industrial devices). In frequency-division duplexing ("FDD"), separate frequency bands may be employed to transmit UL and DL information. In time-division duplexing ("TDD"), a single frequency band may be employed for UL and DL information, but the transmissions are scheduled to occur during different time slots.

Figure 3:
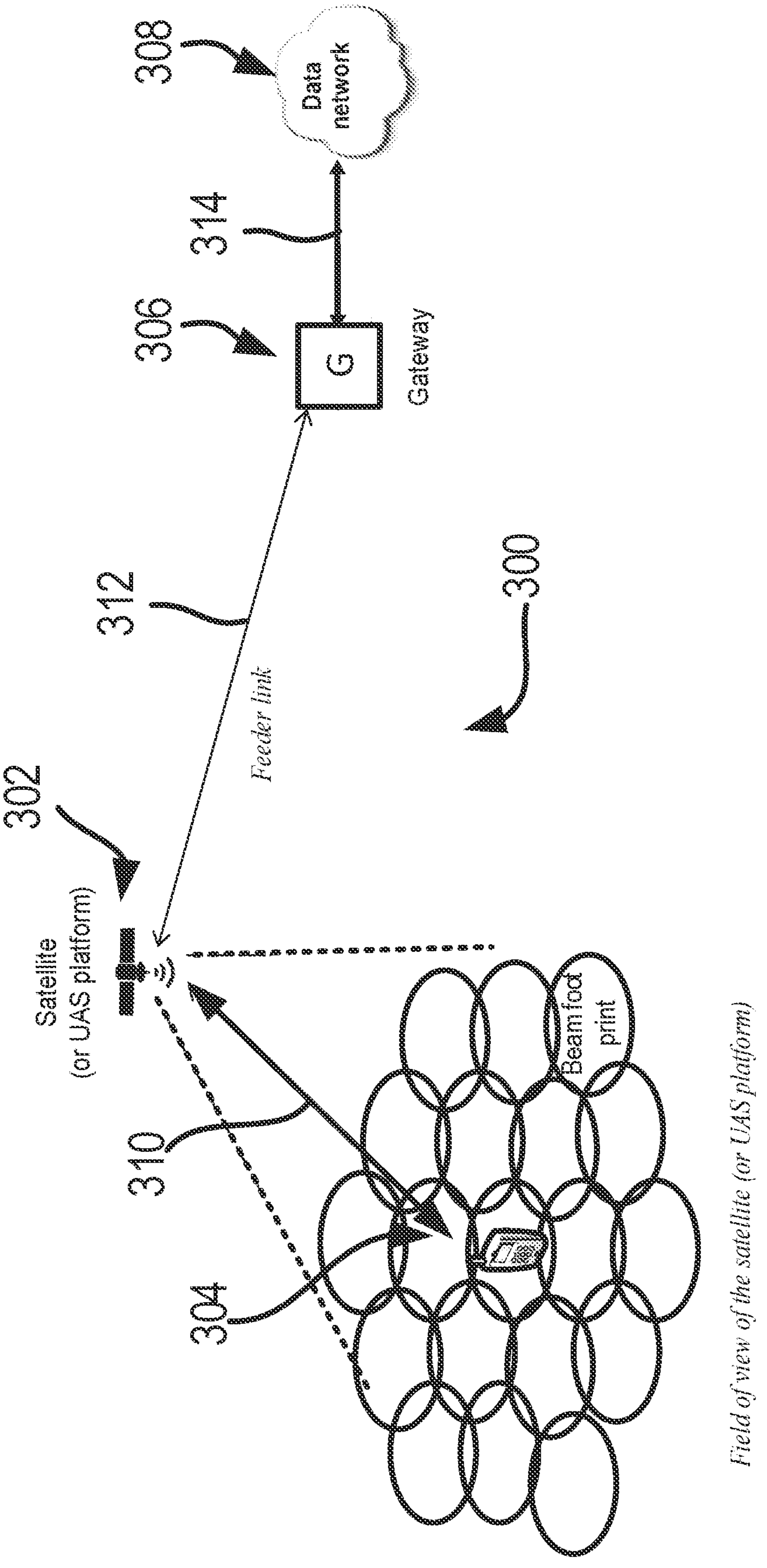
FIG. 3 shows a block diagram of an example non-terrestrial communication network, in accordance with some embodiments of the present disclosure.

FIG. 3 shows a block diagram of an example non-terrestrial communication network 300 including at least one unmanned aerial system based wireless communication nodes. In particular, FIG. 3 shows a communication network 300 including a satellite or an unmanned aerial vehicle (UAV) 302, UE 304, a gateway 306 and a data network 308. The satellite 302 can serve as a platform for a base station, such as, for example, the BS 102 and 202 discussed above in relation to FIGS. 1 and 2, and the UE 304 can be similar to the UE 104 and 204 discussed above in relation to FIGS. 1 and 2. The UE 304 and the BS on the satellite 302 can communicate over a communication link 310, and the BS on the satellite 302 and the gateway 306 can communicate over a feeder link 312. The gateway 306 can communicate with the data network 308 over a data link 314.

Figure 4:
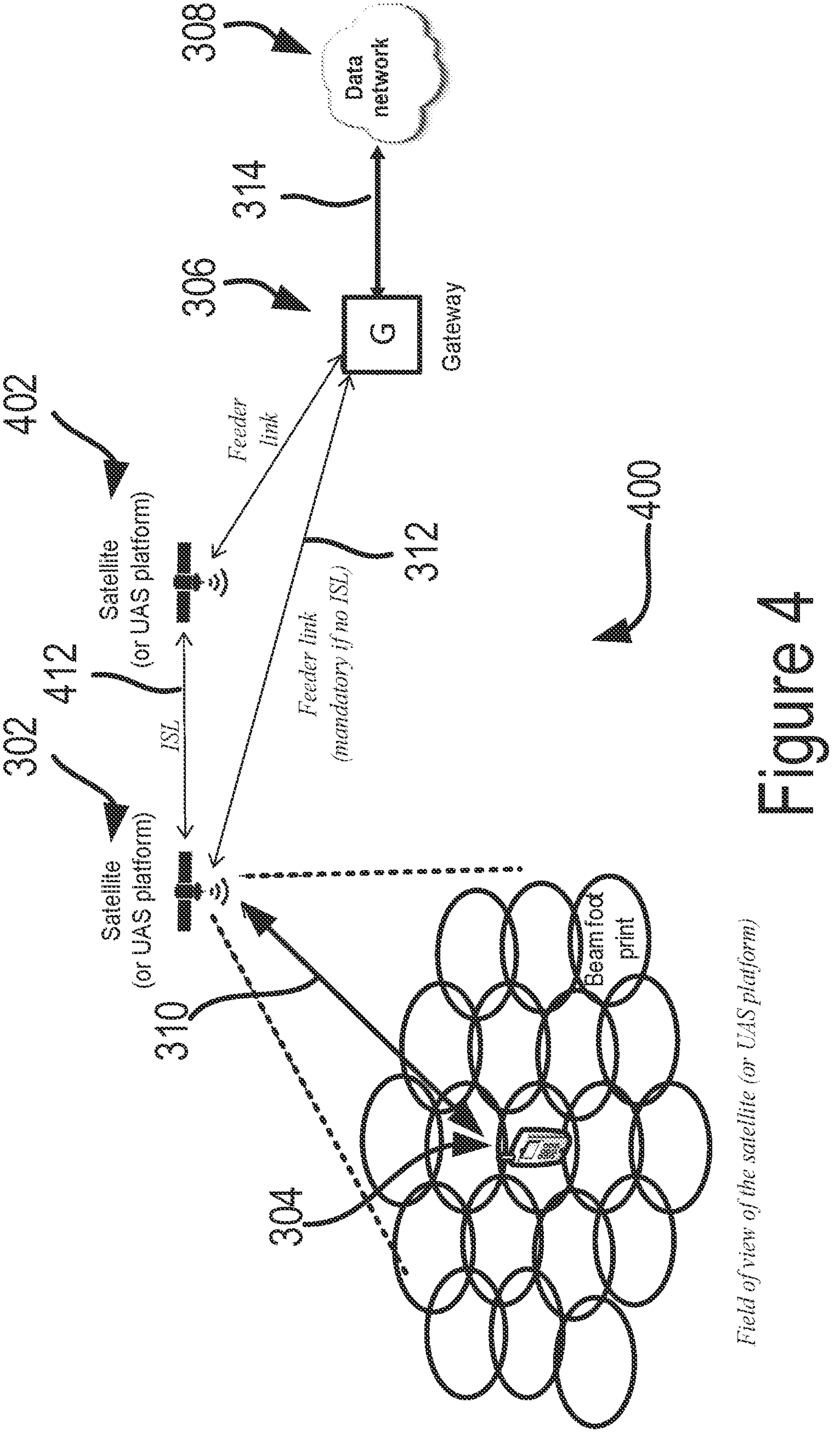
FIG. 4 shows a block diagram of an example non-terrestrial communication network, in accordance with some embodiments of the present disclosure.

FIG. 4 shows another example non-terrestrial communication network 400 including at least one unmanned aerial system based wireless communication nodes. The communication network 400 shown in FIG. 4 is similar to the communication network 300 shown in FIG. 3, but include an additional satellite or UAV platform 402. FIG. 4 depicts the scenario where the communication network includes a constellation of satellites that allow communication between the UE and the gateway or data network.

The gateway can be one of several gateways that can provide connectivity between satellite 302/402 and the data network 308, which can be a public terrestrial data network. The gateways can be deployed across the satellite's targeted coverage area, which can include regional or continental coverage area. In examples where the satellite is a non-geostationary earth orbit satellite ("non-GEO satellite"), the satellite can be served successively by one or several gateways at a time. The communication network can ensure that there is the service link and the feeder link continuity is maintained between successive gateways with sufficient time duration to proceed with mobility anchoring and handover. In some examples, the UE in a cell may be served by only one gateway.

The satellite can implement either a transparent or a regenerative (with on-board processing) payload. The satellite can generate several beams over a service area that can be bounded by its field of view, which can depend on the on-board antenna characteristics and a minimum elevation angle of the satellite. The footprints of the beams on the surface of the earth can be elliptical in shape. In instances where the satellite implements transparent payload, the satellite may carry out radio filtering, frequency conversion, and amplification, thereby repeating the signals. In instances where the satellite platform implements regenerative payload, the satellite can carry out radio frequency filtering, frequency conversion, amplification, as well as demodulation/modulation, switching and/or routing, coding/modulation, etc., effectively carrying out functions, at least in part, of a base station on-board the satellite.

In instances where the communication system includes a constellation of satellites, such as for example, the communication system shown in FIG. 4, the network can include an inter-satellite link ("ISL") 412. In some such instances, the satellites can implement regenerative payload. The ISL can may operate in RF or in optical frequency bands.

Table 1 below lists various types of satellites that can be used to implement the satellite/UAV 302 and 402 shown in FIGS. 3 and 4. The types of satellites and the corresponding information shown in Table 1 are only examples and are not limiting, as other types of platforms and satellites can also be utilized.

TABLE 1

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/ azimuth with respect to a given earth point | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

In some embodiments, GEO satellite and UAS platforms can be used to provide continental, regional, or local service. In some embodiments, a constellation of LEO and MEO satellites can be used to provide services in both northern and southern hemispheres. In some instances, constellation of satellites can even provide global coverage including the polar regions. In some such instances, appropriate orbit inclination, ISLs and beams can be selected.

A reference signal (RS) may be transmitted to assist in channel UL and/or DL estimation. However, in NTN networks, long continuous repeated transmissions, quickly moving satellites, and the effect of Doppler frequency shifts may decrease the usefulness of the RS.

To compensate for Doppler shift (or frequency offset) and time offset (or time delay) based on the locations of the UE and satellite, a UE may pre-compensate the Doppler shift and time offset. However, the value of the time delay and frequency offset may change during the continuous repeated transmissions between the UE and the BS.

IoT devices may use two downlink synchronization signals, a primary synchronization signal (PSS) and a secondary synchronization signal (SSS) to compensate for the frequency shift and/or time offset. However, the PSS/SSS density transmitted via IoT devices is much smaller than the density of PSS/SSS new radio (NR) signals. Further, IoT devices do not utilize Trace Reference Signals (TRS) while NR devices utilize TRS. While NR has these, and other advantages, over IoT devices, IoT devices are still used. Accordingly, synchronization solutions that operate under the constraints of IoT devices are necessary.

Accordingly, Global Navigation Satellite System (GNSS) signals (or other real-time satellite information signals) may provide information to facilitate time and/or frequency synchronization of devices, including NR devices and in particular IoT devices, by providing a reference time for correction by updating the position of the UE. Accordingly, the pre-compensation performed by the UE, including the time delay (or timing advance) and frequency offset may be updated based on the GNSS signal. Additionally or alternatively, the UE may perform post-compensation frequency offset, time delays and decode data using the GNSS signal. Consequently, the GNSS signal may be considered a synchronization-assistance signal.

2. Receiving a GNSS Signal During a Gap

Figure 5:
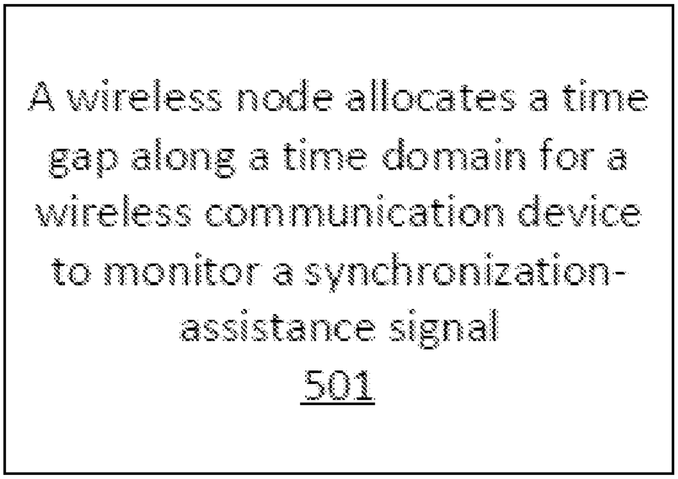
FIG. 5 illustrates a flow chart of an example method of a base station allocating a time gap, in accordance with some embodiments of the present disclosure.
Figure 6:
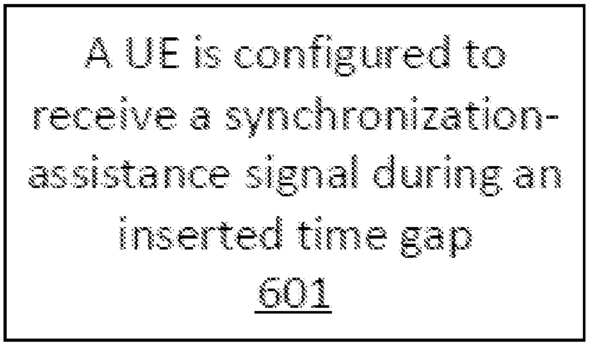
FIG. 6 illustrates a flow chart of an example method of a user equipment device receiving a time gap, in accordance with some embodiments of the present disclosure.

The time offset and frequency offset that inherently occur in NTN communication systems may be addressed by inserting a time gap (or gap) with synchronization-assistance information. During the gap, timing and/or frequency re-synchronization may occur. FIG. 5 illustrates a flow chart of an example method of a BS allocating a time gap. As described in 501, the BS allocates the gap along the time-domain such that the UE monitors for a synchronization-assistance signal such as the GNSS signal. The BS may allocate the time gap in the time domain periodically or aperiodically, as discussed herein. The BS may configure the gap using a DL message, where the DL message includes Physical Downlink Control Channel (PDCCH) transmission or a Physical Downlink Shared Channel (PDSCH) transmission. FIG. 6 illustrates a flow chart of an example method of a UE receiving a synchronization-assistance signal during a time gap. As described in 601, the UE receives a synchronization-assistance signal, such as the GNSS signal, during a gap. The UE may insert the time gap periodically or aperiodically, as discussed herein.

The gap may be inserted by the UE between UL or DL transmissions. For example, the BS may configure the time gap an offset away from the starting position of the start or end of a UL or DL transmission.

For half-duplex-frequency domain duplexing UEs, the duration of the gap may be determined by the BS to be long enough for the UE to transition from UL to DL, receive the GNSS signal, determine the timing advance and/or frequency offset measurements and estimations based on the GNSS signal, pre-compensate using the timing advance and/or frequency offsets, and transition from DL to UL. The UE transitions from UL to DL (or from DL to UL) by stopping a transmission and/or reception and monitoring for a GNSS signal. Additionally or alternatively, the UE may stop receiving a GNSS signal and transmit and/or receive (e.g., conduct a first transmission/reception and/or a second transmission/reception). The time to transition may take x (e.g., 1 or 2) symbols depending on the UE capability and sub-carrier space. The transition may include time to enable the GNSS module and time for interactions to take place between the GNSS module and the NTN baseband module. The time to process, estimate and configure a timing advance and/or frequency offsets based on the GNSS signal may take y (e.g., 1 or 2) symbols depending on the UE capability and sub-carrier space. The time to receive the GNSS signal may be the time to receive an adequate period of the GNSS signal (e.g., time needed to trace the reference time and/or update the UE position). This time, for instance, may require receiving signals from at least four GNSS satellites. Different satellites (for instance, GEO satellites and LEO satellites) may have different moving speeds and timing capabilities. Accordingly, different gap configurations may be allocated for GEO and LEO satellites.

Additionally or alternatively, the UE may suspend the NTN DL receiving signal, receive the GNSS signal, determine the timing advance and/or frequency offset measurements and estimations based on the GNSS signal, post-compensate using the timing advance and/or frequency offsets, and continue the NTN DL receiving signal. For full-duplex-frequency division duplexing UE devices, the duration of the gap may be determined by the BS to ben slots (or frames) long, depending on the UE capability and/or sub-carrier space.

Consequently, the GNSS signal may be used during the gap to provide a reference time for correction and/or an updated position of a UE. The information provided by the GNSS signal can be used for time delay and/or frequency offset for pre-compensation or post-compensation UE adjustments.

The starting position of the gap may be at a fixed symbol and/or slot location. For example, the gap symbol is located in a fixed location in a fixed slot or in fixed subframes in a periodicity.

The starting position of the gap may also be at a relative location. For example, the starting position of the gap may be a time offset corresponding to the start of Physical Uplink Shared Channel (PUSCH) transmissions and/or Physical Downlink Shared Channel (PDSCH). For instance, the time offset may be 256 ms such that the gap begins 256 ms after the start of the PUSCH and/or PDSCH transmission. Additionally or alternatively, the starting position of the gap may be a time offset corresponding to the start or end of the Demodulation Reference Signal (DMRS). For instance, the BS may determine a relative location using the DRMS position during the PDSCH/PUSCH. Additionally or alternatively, the gap may start at an offset value from a first and/or last symbol of a continuous transmission. For instance, the gap may start at an offset from the first and/or last symbol of a period of a UL/DL transmission (e.g., a 256 ms UL transmission). The offset value may be a positive or negative value.

The gap may be periodic, aperiodic, or semi-periodic (e.g., using semi-persistent scheduling). In the event the BS allocates a periodic gap, the BS may determine whether to activate or deactivate one or more gaps, where the one or more gaps may be used to monitor the GNSS signal. A UE may monitor the GNSS signal in the activated gap. In addition to the periodic gap, other gaps may be allocated by the BS and inserted by the UE. For example, the BS may allocate (and the UE may insert) one or more time gaps outside the periodic time gap of the UE (e.g., additional time gaps) such that the UE can receive the GNSS signal.

Figure 7A:
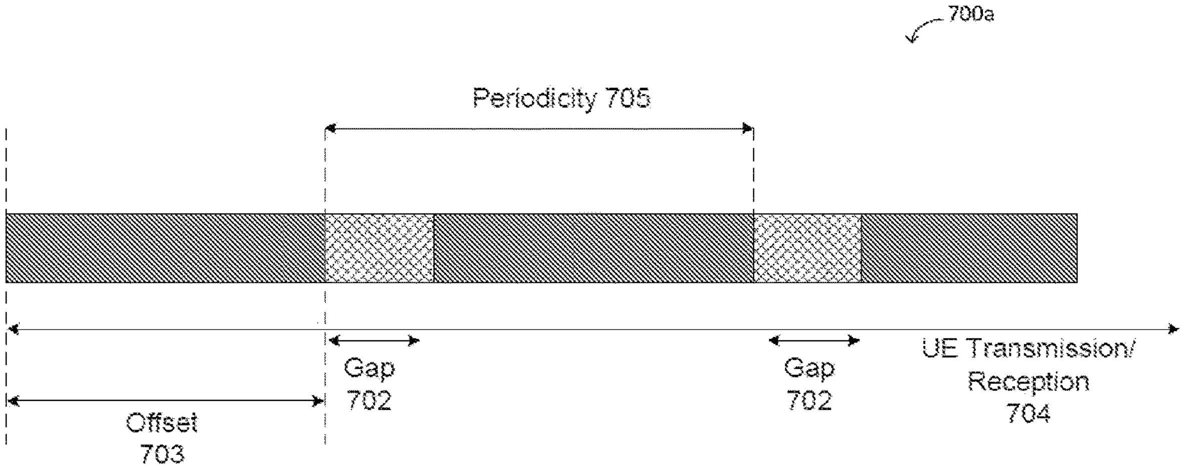
FIG. 7A illustrates and example timing diagram of a periodic gap configured with a positive offset value, in accordance with some embodiments of the present disclosure.

FIG. 7A illustrates an example 700*a* timing diagram of a periodic gap configured with a positive value offset. The starting position of the gap 702 is at the end of the positive offset 703. In an example, the offset 703 may be 256 ms. The period of the gap 702 is shown by periodicity 705. As shown, the UE may be configured to transmit and/or receive 704.

Figure 7B:
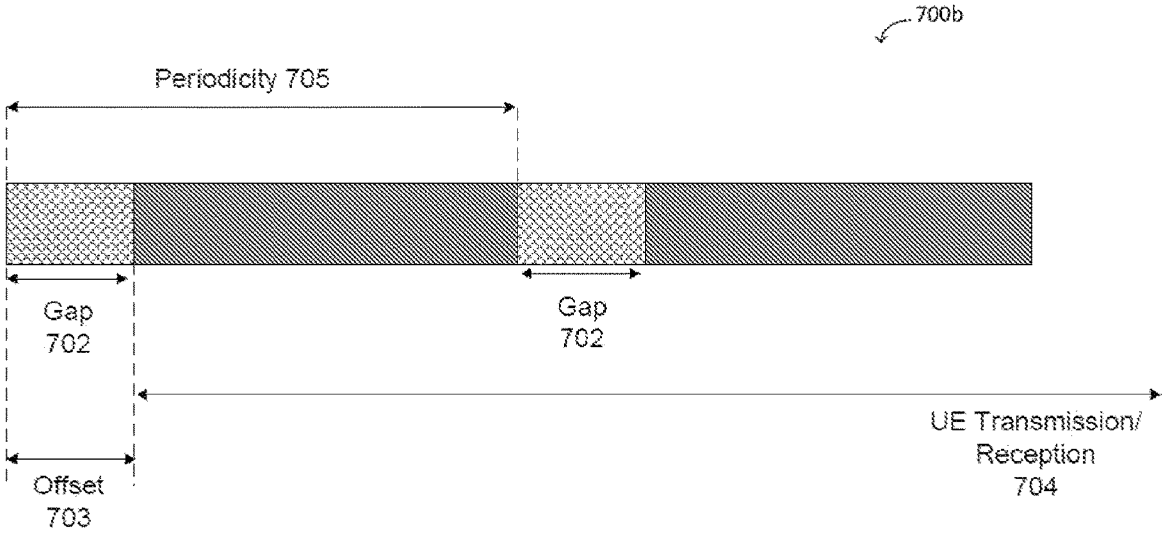
FIG. 7B illustrates and example timing diagram of a periodic gap configured with a negative offset value, in accordance with some embodiments of the present disclosure.

FIG. 7B illustrates an example 700*b* timing diagram of a periodic gap configured with a negative value offset. The starting position of the gap 702 is at the beginning of offset 703. The period of the gap 702 is shown by periodicity 705. As shown, the gap is configured to start at a point before the first symbol of continuous UE transmissions/receptions 704.

The periodicity of the gap may depend on the status of the UE. The status of the UE may refer to whether the UE is in a discontinuous reception period (DRX or eDRX) or a power saving mode (PSM). For example, the periodicity of the gap during a DRX may be configured differently by the BS from the periodicity of the gap during a PSM. Further, the UE may have a different status when the UE is in various states (e.g., RRC connected state, RRC idle state). For instance, the period of a gap of a UE in RRC connected state may be different from a period of a gap of a UE in RRC idle state (or a period of a gap of a UE in RRC inactive state). For connected state UEs, the starting position of the periodic gap may be a time offset from the first slot of a UL transmission. For example, the BS may periodically allocate the gap to be between a first transmission/reception and a second transmission/reception of the UE device in an RRC connected mode.

Figure 8A:
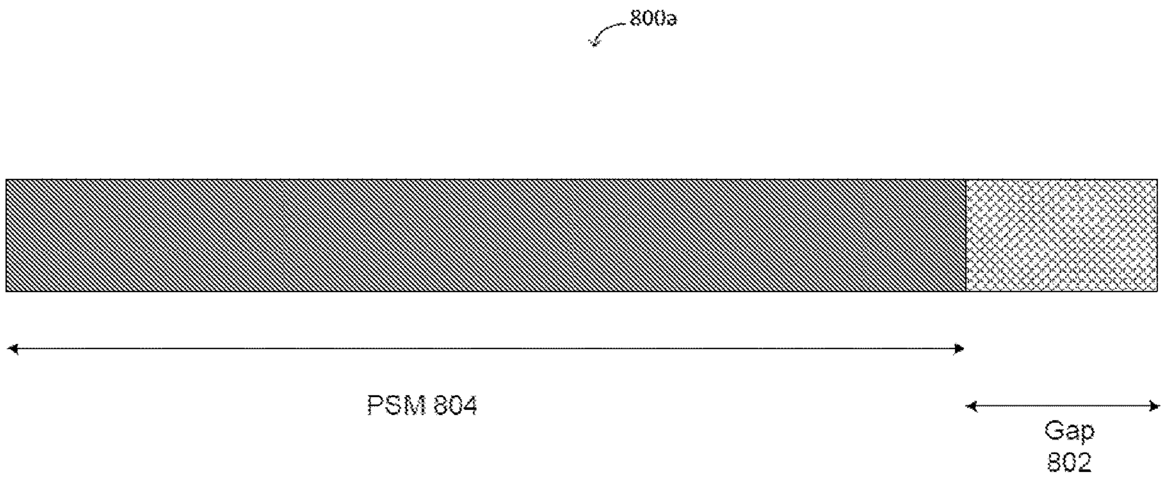
FIG. 8A illustrates an example timing diagram of a gap configured for a user equipment device in power saving mode, in accordance with some embodiments of the present disclosure.

The starting position of the gap may also begin in certain situations. For instance, the UE may insert a gap (allocated by the BS) and receive a GNSS signal during the gap at a reception of a PDCCH transmission during the DRX period (or eDRX period) and/or the end of the PSM mode. FIG. 8A illustrates an example 800*a* timing diagram of a gap configured for a UE in PSM mode. The beginning of the gap 802 starts at the end of the PSM 804. The UE may receive the GNSS signal after the PSM procedure 804 during the gap 802.

Figure 8B:
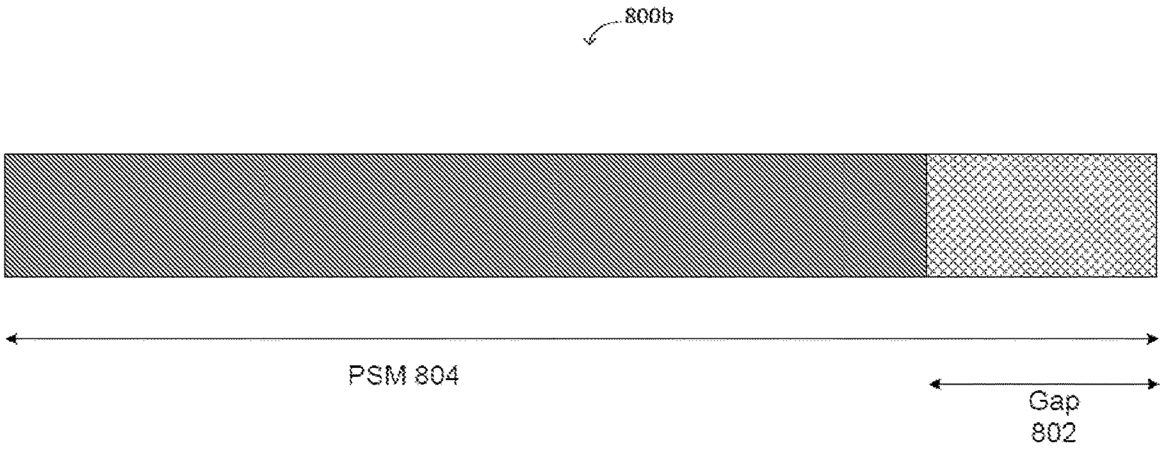
FIG. 8B illustrates an alternative example timing diagram of a gap configured for a user equipment device in power saving mode, in accordance with some embodiments of the present disclosure.

FIG. 8B illustrates an alternative example 800*b* example timing diagram of a gap configured for a UE in PSM mode. As shown, the UE ignores the gap 802 within the PSM 804. The BS may allocate a gap 802, but the UE is in PSM 804 so the UE may ignore the gap 802. As shown, in some instances, the UE may not monitor for GNSS signals during the gap 802. In alternate instances, the UE may receive the GNSS signal within the gap 802 at the end of a PSM 804 duration.

After random access protocols, for RRC connected state UEs during DRX, data reception may be discontinued to conserve battery. The BS may allocate the starting position of the gap to occur before a first transmission of the UE while the UE is in an RRC idle mode. The first transmission of the UE in an RRC idle mode may be a preamble transmission or a transmission of a preamble and a payload. The UE in an RRC idle state may discontinuously receive paging information on PDCCH. In an example, a UE may receive a GNSS signal at a gap before each time the UE receives data (e.g., at a time before the UE begins an "on" state).

Figure 9:
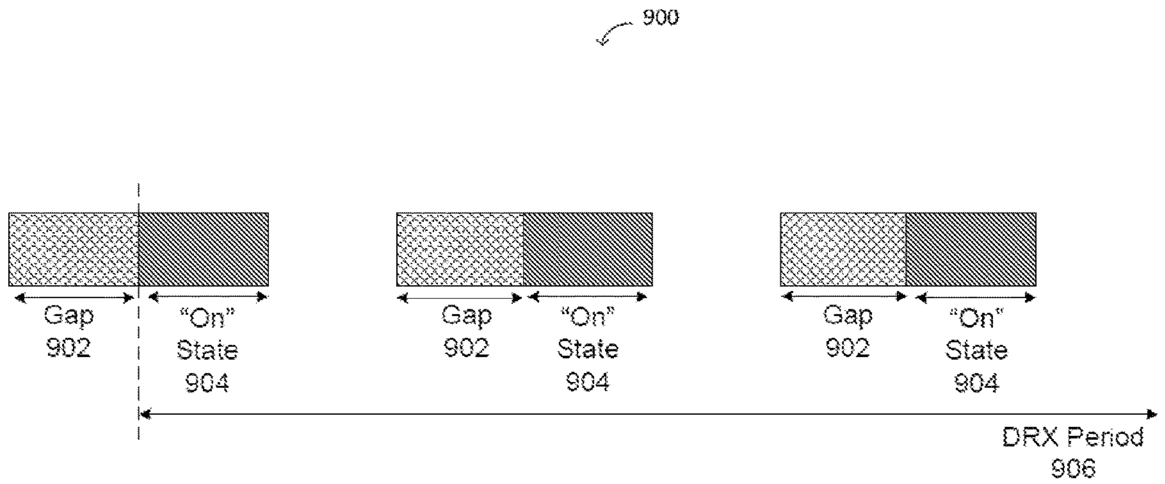
FIG. 9 illustrates an example timing diagram of a gap configured for a radio resource control connected state UE in DRX mode, in accordance with some embodiments of the present disclosure.

FIG. 9 illustrates an example 900 timing diagram of a gap configured for an RRC conducted state UE in DRX mode. A UE is configured to begin a gap 902 before the UE receives data in an "on" state 904 in the DRX period 906. The discontinuous reception of data and the gaps for receiving the GNSS signal may occur in the DRX period 906.

Figure 10:
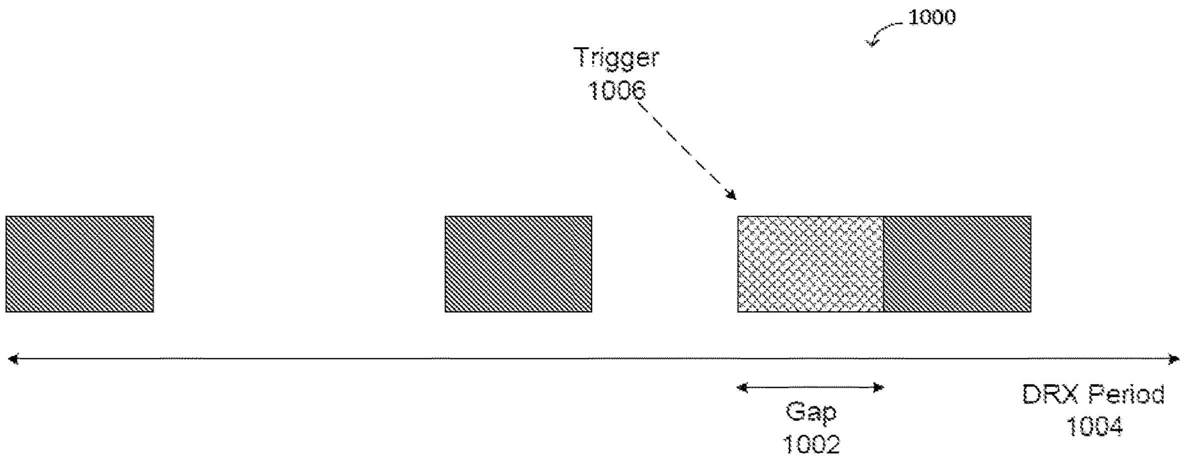
FIG. 10 illustrates an example timing diagram of a gap configured in a radio resource control idle state user equipment device in DRX mode, in accordance with some embodiments of the present disclosure.

In alternate embodiments, the UE may be triggered to begin a gap based on a triggering event. FIG. 10 illustrates an example 1000 timing diagram of a gap configured in an RRC idle state UE in DRX mode. As shown, trigger 1006 is an indication for the UE to insert gap 1002 during the DRX period 1004. The triggering event may include a transmission/reception of an RRC signal, a transmission/reception of DCI information, a PDCCH order based PRACH, a beam switching procedure, or a handover procedure. The time resource allocation (e.g., starting position of the gap and gap duration) may be indicated in control information. For example, DCI information may indicate the time resource allocation. As such, the gap is an aperiodic gap. A BS may allocate a gap to a starting position away from an instant at which an event is triggered with an offset.

Figure 11:
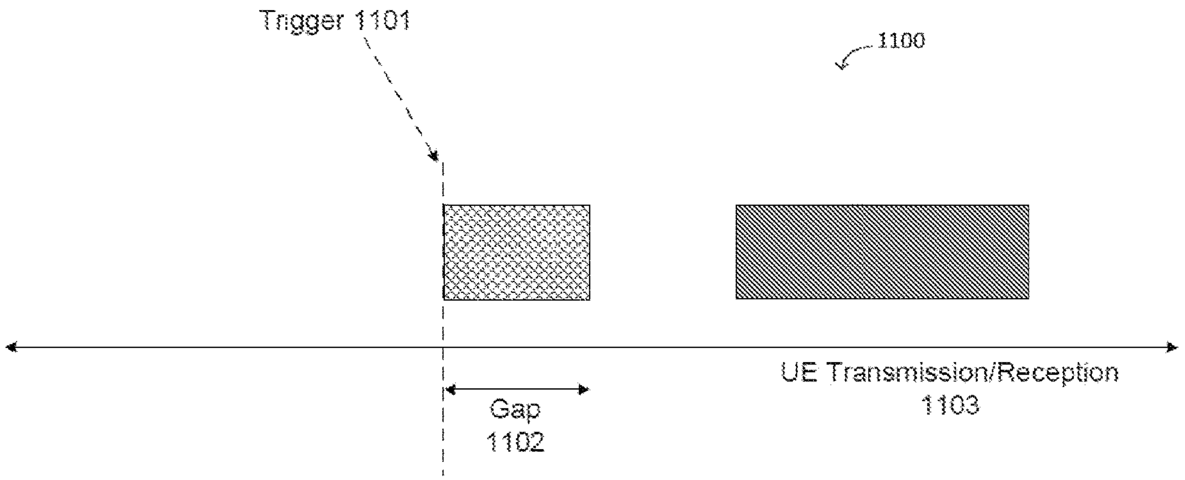
FIG. 11 illustrates an example timing diagram of an aperiodic gap, in accordance with some embodiments of the present disclosure.

FIG. 11 illustrates an example 1100 timing diagram of an aperiodic gap. The trigger 1101 triggers the starting position of the gap 1102. The trigger 1101 may occur during the UE transmission and/or reception period 1103.

Figure 12:
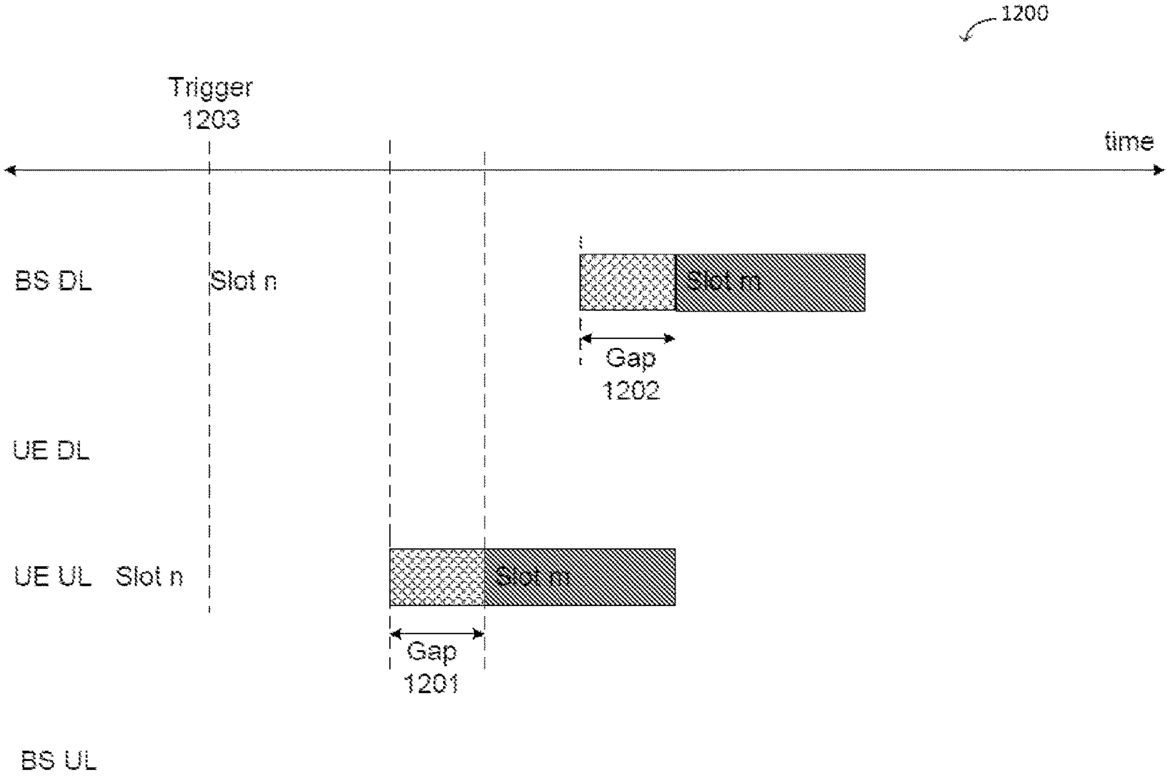
FIG. 12 illustrates an example timing diagram for a system involving a base station and a user equipment device, in accordance with some embodiments of the present disclosure.

FIG. 12 illustrates an example 1200 timing diagram for a system involving a BS and a UE. During a BS DL transmission, a BS may trigger event 1203 and indicate, in slot n, the time resource allocation of a gap (e.g., the gap starting point and the duration of the gap). The BS may offset the starting position of the gap from slot n by less than a propagation delay to ensure that the DCI information is received by the UE. As shown, gap 1201 starts less than a propagation delay after slot n. The BS allocates enough time for the gap such that the gap is large enough for the UE to receive the GNSS signal, perform estimations using the GNSS signal (e.g., timing advances and frequency offsets), and resume UL/DL transition operations. The UE begins the UL transmission of slot mat the end of gap 1201. The BS may use gap 1202 to monitor a GNSS signal.

The UE may be configured to receive the GNSS in the gap based on a MAC CE signal. For example, the MAC CE signal may indicate to the UE to activate or deactivate a configuration, the configuration allowing and/or prohibiting reception of the GNSS in the gap. In alternate embodiments, DCI information may indicate to the UE to active or deactivate a configuration, the configuration allowing and/or prohibiting reception of the GNSS in the gap.

Allowing and/or prohibiting the reception of the GNSS signal may affect the power consumption of the UE because receiving the GNSS signal consumes power. In one instance, the MAC CE signal may disable the reception of GNSS signals in PSM such that the power consumed in PSM is very low. The UE may consume less power by prohibiting the reception of the GNSS signal.

In some embodiments, the gap may be a gap used in full NR devices. That is, the gap may be a legacy gap in legacy UEs (as opposed to reduced capability UEs). In some instances, the legacy gap may be configured during continuous UL transmissions. For example, the legacy gap may be inserted at the end of a maximum continuous UL transmission. In other instances, the compensation gap may occur after PRACH transmission and/or PUSCH transmissions. In other instances, the UL transmission may interrupt the gap. In the event the UL transmission interrupts the gap, the UE may drop the UL transmission.

A BS may allocate a gap for an IoT UE to receive GNSS signals. For example, for continuous UL transmissions, the BS may allocate a gap during which an IoT UE can receive a GNSS signal. Further, a UE may receive a GNSS signal depending on a state defined by the RRC states. For example, when the UE is in a receiving state, the UE may receive a GNSS signal in a gap. Additionally or alternatively, the UE may be in one or more RRC idle states. During an idle state, the UEs in cells may be configured to receive GNSS signals within a gap. For example, when the UE powers on, before a random access protocol, a UE may spend a period of time searching a cell for the GNSS signal. Accordingly, the GNSS signal may include ephemeris binary code. During random access protocols, for instance for PRACH transmissions, a BS may allocate a gap for the UE to receive a GNSS signal.

In other embodiments, the GNSS signal may be received using the GNSS specific frequency spectrum. During the gap duration, the carriers or narrowband used for NB-IoT or eMTC may not be used for transmission and/or reception.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:

allocating, by a wireless communication node, a time gap for a wireless communication device to monitor a synchronization-assistance signal comprising a Global Navigation Satellite System (GNSS) signal; and transmitting, by the wireless communication node to the wireless communication device, a downlink message indicating the time gap for the wireless communication device to monitor the synchronization-assistance signal, wherein the time gap for the wireless communication device to monitor the synchronization-assistance signal is to occur between a first transmission or reception (TX/RX) and a second TX/RX of the wireless communication device.

2. The wireless communication method of claim 1, further comprising configuring, by the wireless communication node, a starting position of the time gap to be away from an instant at which an event is triggered with an offset.

3. The wireless communication method of claim 2, wherein the event includes at least one of: a transmission/reception (TX/RX) of an RRC signaling, a TX/RX of Downlink Control Information (DCI), a Physical Downlink Control Channel (PDCCH) order based Physical Random Access Channel (PRACH), a beam switching procedure, or a handover procedure.

4. The wireless communication method of claim 1, further comprising configuring, by the wireless communication node, for the wireless communication device which is in different status, different periodicity of the time gap.

5. The wireless communication method of claim 1, further comprising allocating, by the wireless communication node, the time gap to occur before a first transmission of the wireless communication device, which is in an RRC idle mode.

6. The wireless communication method of claim 5, wherein the first transmission of the wireless communication device in the RRC idle mode comprises a preamble transmission, or a transmission of a preamble and a payload.

7. The wireless communication method of claim 1, further comprising allocating, by the wireless communication node, the time gap to occur between the first TX/RX and the second TX/RX of the wireless communication device, which is in a Radio Resource Control (RRC) connected mode.

8. The wireless communication method of claim 1, wherein when the time gap is periodically allocated along a time-domain, the method further comprises allocating, by the wireless communication node, one or more other time gaps outside the time gap for the wireless communication device to monitor the synchronization-assistance signal.

9. The wireless communication method of claim 1, wherein when the time gap is periodically allocated along a time-domain, the method further comprises determining, by the wireless communication node, to activate or deactivate each of one or more time gaps for the wireless communication device to monitor the synchronization-assistance signal.

10. The wireless communication method of claim 1, further comprising configuring, by the wireless communication node, a starting position of the time gap to be away from a start or an end of an uplink/downlink (UL/DL) transmission with an offset.

11. The wireless communication method of claim 1, further comprising configuring, by the wireless communication node, a starting position of the time gap to be away from a Demodulation Reference Signal (DMRS) position with an offset.

12. The wireless communication method of claim 10, wherein the time gap starts from a first or last symbol of a period of the UL/DL transmission, in which the offset is a positive value; or the time gap starts from a point before a first or last symbol of the period of the UL/DL transmission, in which the offset is a negative value.

13. The wireless communication method of claim 1, further comprising allocating, by the wireless communication node, the time gap to occur only in certain situation.

14. The wireless communication method of claim 13, wherein the certain situation includes at least one of: end of a power saving mode (PSM), reception of PDCCH during a discontinuous reception period (DRX) mode or an extended discontinuous reception (eDRX) mode.

15. The wireless communication method of claim 1, further comprising allocating, by the wireless communication node, one or more time-domain resources for the time gap via downlink control information (DCI), wherein the one or more time-domain resources include at least one of: a starting point of the time gap or a duration of the time gap.

16. The wireless communication method of claim 1, further comprising transmitting, by the wireless communication node to the wireless communication device, a downlink message that configures the time gap, wherein the downlink message includes at least one of a Physical Downlink Control Channel (PDCCH) or a Physical Downlink Shared Channel (PDSCH).

17. A wireless communication node, comprising:
at least one processor configured to:
allocate a time gap for a wireless communication device to monitor a synchronization-assistance signal comprising a Global Navigation Satellite System (GNSS) signal; and
transmit, to the wireless communication device, a downlink message indicating the time gap for the wireless communication device to monitor the synchronization-assistance signal,
wherein the time gap for the wireless communication device to monitor the synchronization-assistance signal is to occur between a first transmission or reception TX/RX) and a second TX/RX of the wireless communication device.

18. A wireless communication method, comprising:
receiving, by a wireless communication device, a synchronization-assistance signal comprising a Global Navigation Satellite System (GNSS) signal during a time gap for the wireless communication device to monitor the synchronization-assistance signal,
wherein the time gap for the wireless communication device to monitor the synchronization-assistance signal is to occur between a first transmission or reception (TX/RX) and a second TX/RX of the wireless communication device.

19. A wireless communication device, comprising:
at least one processor configured to:
receive, via a receiver, a synchronization-assistance signal comprising a Global Navigation Satellite System (GNSS) signal during a time gap for the wireless communication device to monitor the synchronization-assistance signal,
wherein the time gap for the wireless communication device to monitor the synchronization-assistance signal is to occur between a first transmission or reception (TX/RX) and a second TX/RX of the wireless communication device.

* * * * *